US012763852B2

(12) United States Patent
Ramantanis et al.

(10) Patent No.: US 12,763,852 B2
(45) Date of Patent: Oct. 13, 2026

(54) METHOD AND APPARATUS FOR IDENTIFYING MEASUREMENTS OF OPTICAL LINK PERFORMANCE THAT ARE UNRELIABLE

(71) Applicant: Nokia Solutions and Networks Oy, Espoo (FI)

(72) Inventors: Petros Ramantanis, Massy (FR); Fabien Boitier, Massy (FR); Camille Delezoide, Massy (FR); Patricia Layec, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 279 days.

(21) Appl. No.: 18/660,693

(22) Filed: May 10, 2024

(65) Prior Publication Data

US 2024/0380484 A1 Nov. 14, 2024

(30) Foreign Application Priority Data

May 10, 2023 (EP) ..................................... 23315181

(51) Int. Cl.
*H04B 10/079* (2013.01)
*H04B 10/61* (2013.01)

(52) U.S. Cl.
CPC ... *H04B 10/07951* (2013.01); *H04B 10/6161* (2013.01)

(58) Field of Classification Search
None
See application file for complete search history.

(56) References Cited

U.S. PATENT DOCUMENTS 8,953,951 B1 2/2015 Thomas et al.
9,425,900 B2 * 8/2016 Magri ................ H04B 10/6971
(Continued)

FOREIGN PATENT DOCUMENTS

BR 102014017868 A2 * 2/2016 ......... H04B 10/2519
EP 2357740 A1 8/2011
(Continued)

OTHER PUBLICATIONS

Delezoide et al., "Investigating Q-drops and their probable causes", European Conference on Optical Communication (ECOC), Sep. 18-22, 2022, 4 pages.
(Continued)

*Primary Examiner* — Jai M Lee
(74) *Attorney, Agent, or Firm* — Nokia Technologies Oy

(57) ABSTRACT

A method comprising: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

14 Claims, 9 Drawing Sheets

(56) References Cited

U.S. PATENT DOCUMENTS

| | | | | |
|---|---|---|---|---|
| 9,722,698 | B2 * | 8/2017 | Dahan | H04B 10/07953 |
| 10,523,323 | B2 * | 12/2019 | Kang | H04B 10/25133 |
| 11,121,769 | B2 * | 9/2021 | Oveis Gharan | H04B 10/50 |
| 2001/0048539 | A1 | 12/2001 | Kubo et al. | |
| 2014/0356003 | A1 * | 12/2014 | Randel | H04B 10/6161 398/208 |
| 2015/0229410 | A1 * | 8/2015 | Magri | H04B 10/6161 398/26 |
| 2016/0329960 | A1 | 11/2016 | Yao et al. | |

FOREIGN PATENT DOCUMENTS

| | | | |
|---|---|---|---|
| WO | 2015/188872 | A1 | 12/2015 |
| WO | 2021/185445 | A1 | 9/2021 |

OTHER PUBLICATIONS

Ghobadi et al., "Optical Layer Failures in a Large Backbone", Proceedings of the 2016 Internet Measurement Conference, 2016, pp. 461-467.

"Leveraging Field Data For The Joint Optimization of Capacity and Availability in Low-Margin Optical Networks", Journal of Lightwave Technology, vol. 38, No. 24, Dec. 15, 2020, pp. 6709-6718.

Mecozzi et al., "Use of optical coherent detection for environmental sensing", Journal of Lightwave Technology, vol. 41, No. 11, Jun. 1, 2023, pp. 3350-3357.

"Evaluation of measurement data: Guide to the expression of uncertainty in measurement", JCGM 100, First edition. Sep. 2008, 134 pages.

Proakis et al., "Digital Communications", McGraw-Hill, 5th Edition, 2008, 1170 pages.

Delezoide et al., "Field trial of failure localization in a backbone optical network", European Conference on Optical Communication (ECOC), Sep. 13-16, 2021, 4 pages.

Lonardi et al., "Optical Nonlinearity Monitoring and Launch Power Optimization by Artificial Neural Networks", Journal of Lightwave Technology, vol. 38, No. 9, May 1, 2020, pp. 2637-2645.

Hauske et al., "Optical Performance Monitoring in Digital Coherent Receivers", Journal of Lightwave Technology, vol. 27, No. 16, Aug. 2009, pp. 3623-3631.

Kato et al., "Temperature dependence of chromatic dispersion in various types of optical fiber", Optical Fiber Communication Conference. Technical Digest Postconference Edition. Trends in Optics and Photonics vol. 37 (IEEE Cat. No. 00CH37079), Mar. 7-10, 2000, 3 pages.

Ghosh et al., "Pressure-dependent sellmeier coefficients and material dispersions for silica fiber glass", Journal of Lightwave Technology, vol. 16, No. 11, Nov. 1998, pp. 2002-2005.

Ghosh et al., "Temperature-dependent sellmeier coefficients and chromatic dispersions for some optical fiber glasses", Journal of Lightwave Technology, vol. 12, No. 8, Aug. 1994, pp. 1338-1342.

Horvitz et al., "A national temperature record at Loma, montana", 12th Symposium on Meteorological Observations and Instrumentation, 2002, 2 pages.

Hamp et al., "Investigation into the Temperature Dependence of Chromatic Dispersion in Optical Fiber", IEEE Photonics Technology Letters, vol. 14, No. 11, Nov. 2002, pp. 1524-1526.

Xie, "Chromatic Dispersion Estimation for Single-Carrier Coherent Optical Communications", IEEE Photonics Technology Letters, vol. 25, No. 10, May 2013, pp. 992-995.

Extended European Search Report received for corresponding European Patent Application No. 23315181.0, dated Oct. 30, 2023, 10 pages.

* cited by examiner

METHOD AND APPARATUS FOR IDENTIFYING MEASUREMENTS OF OPTICAL LINK PERFORMANCE THAT ARE UNRELIABLE

This application claims the priority of European patent application no. 23315181.0 filed on May 10, 2023, the contents of which are incorporated herein by reference in their entirety.

TECHNICAL FIELD

Various example embodiments relate generally to a method and a corresponding apparatus for determining that measurements of optical link performance are unreliable.

BACKGROUND

Monitoring based on coherent optical receivers is a cost-effective strategy to acquire data concerning the health of an optical network. Quality of transmission (QoT) metrics such as the pre-FEC bit error ratio (BER), the error vector magnitude (EVM), etc, may be recorded by coherent optical receivers of each optical link (or light path). These metrics may be transmitted, e.g. by telemetry, to an optical network monitor and stored in dedicated databases, to be analysed.

In this context, one class of events are the ones of sudden, increases of the BER (or decreases of the equivalent $Q^2$, often referred to in the literature as "Q-drops"). Such events are often temporary in that normal operation is resumed without any external intervention.

SUMMARY

Various embodiments monitor for Q-drops, which may negatively impact the reliability of system performance measurements. Monitoring and analysing Q-drops is useful to understand their cause and propose some suitable maintenance action (proactive or reactive) which could help optimize the availability of the system or the effective margins, over the whole lifetime of the network.

In particular, the inventors believe that the rate of variation of the accumulated chromatic dispersion can be a useful indicator for identifying unreliable measurements of optical link performance.

The accumulated chromatic dispersion relates to the property or the tendency of the quantity of chromatic dispersion of an optical signal to accumulate along an optical link through which this optical signal is transmitted. Another equivalent term such as "cumulative chromatic dispersion" is also used in the technical domain.

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method comprises: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

At least some of the measurements of optical link performance may include at least one of a bit error rate, a number of bit errors, an uncorrected block error, an uncorrected block error rate and an error vector magnitude.

At least some of the measurements of optical link performance may be indicative of a characteristic type selected from the group consisting of pre-FEC bit-error-rate, rate of change of the pre-FEC bit-error-rate, post-FEC bit-error-rate, rate of change of the post-FEC bit-error-rate, and cycle slip rate.

The method may include evaluating a weighted bit error rate from a subset of the measurements of the optical link performance in response to determining that the measurements of the subset were made near times that the estimates indicate that the accumulated chromatic dispersion of the optical signal varied slower than the threshold rate.

The method may include producing new estimates of the accumulated chromatic dispersion from received samples of the optical signal by operating a digital equalizer with the received samples.

At least some of the estimates of the accumulated chromatic dispersion may be generated with a digital equalizer.

According to a second aspect an apparatus, comprises: an optical network monitor connected to receive measurements of optical link performance from an optical network, the measurements being made at a coherent optical receiver of the optical network; wherein the optical network monitor is also configured to receive estimates of accumulated chromatic dispersion of an optical signal or a rate of change of said accumulated chromatic dispersion, the estimates being indicative of measurements at corresponding times by the coherent optical receiver that received the optical signal from an optical link of the optical network; and wherein the optical network monitor is configured to identify at least one of the measurements of optical link performance as being unreliable in response to determining that the estimates indicate the accumulated chromatic dispersion of the optical signal varied at an above threshold rate near the time of the at least one of the measurements of optical link performance.

At least some of the measurements of optical link performance may include at least one of a bit error rate, a number of bit errors, an uncorrected block error, an uncorrected block error rate and an error vector magnitude.

At least some of the measurements of optical link performance may be indicative of a characteristic type selected from the group consisting of pre-FEC bit-error-rate, rate of change of the pre-FEC bit-error-rate, post-FEC bit-error-rate, rate of change of the post-FEC bit-error-rate, and cycle slip rate.

The optical network monitor may be configured to evaluate a weighted bit error rate from a subset of the measurements of the optical link performance in response to determining that the measurements of the subset were made near times that the estimates indicate that the accumulated chromatic dispersion of the optical signal varied slower than the threshold rate.

The optical network monitor may be configured to produce new estimates of the accumulated chromatic dispersion from received samples of the optical signal by operating a digital equalizer with the received samples.

According to another aspect, an apparatus comprises means for performing a method comprising: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

The apparatus may comprise means for performing one or more or all steps of the method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of a method according to the first aspect.

According to another aspect, an apparatus comprises at least one processor and at least one memory storing instructions that, when executed by the at least one processor, cause the apparatus to perform the steps: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

The instructions, when executed by the at least one processor, may cause the apparatus to perform one or more or all steps of a method according to the first aspect.

According to another aspect, a computer program comprises instructions that, when executed by an apparatus, cause the apparatus to perform: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

The instructions may cause the apparatus to perform one or more or all steps of a method according to the first aspect.

According to another aspect, a non-transitory computer readable medium comprises program instructions stored thereon for causing an apparatus to perform at least the following: from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times; from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance.

The program instructions may cause the apparatus to perform one or more or all steps of a method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

An optical receiver acts as an independent instrument performing measurements. To be able to determine whether the measurements are reliable, e.g. such that the measurements allow for any meaningful interpretation or comparison, the instrument (i.e. the optical receiver) needs to be characterized in terms of uncertainty and bias at all times.

Figure 1:
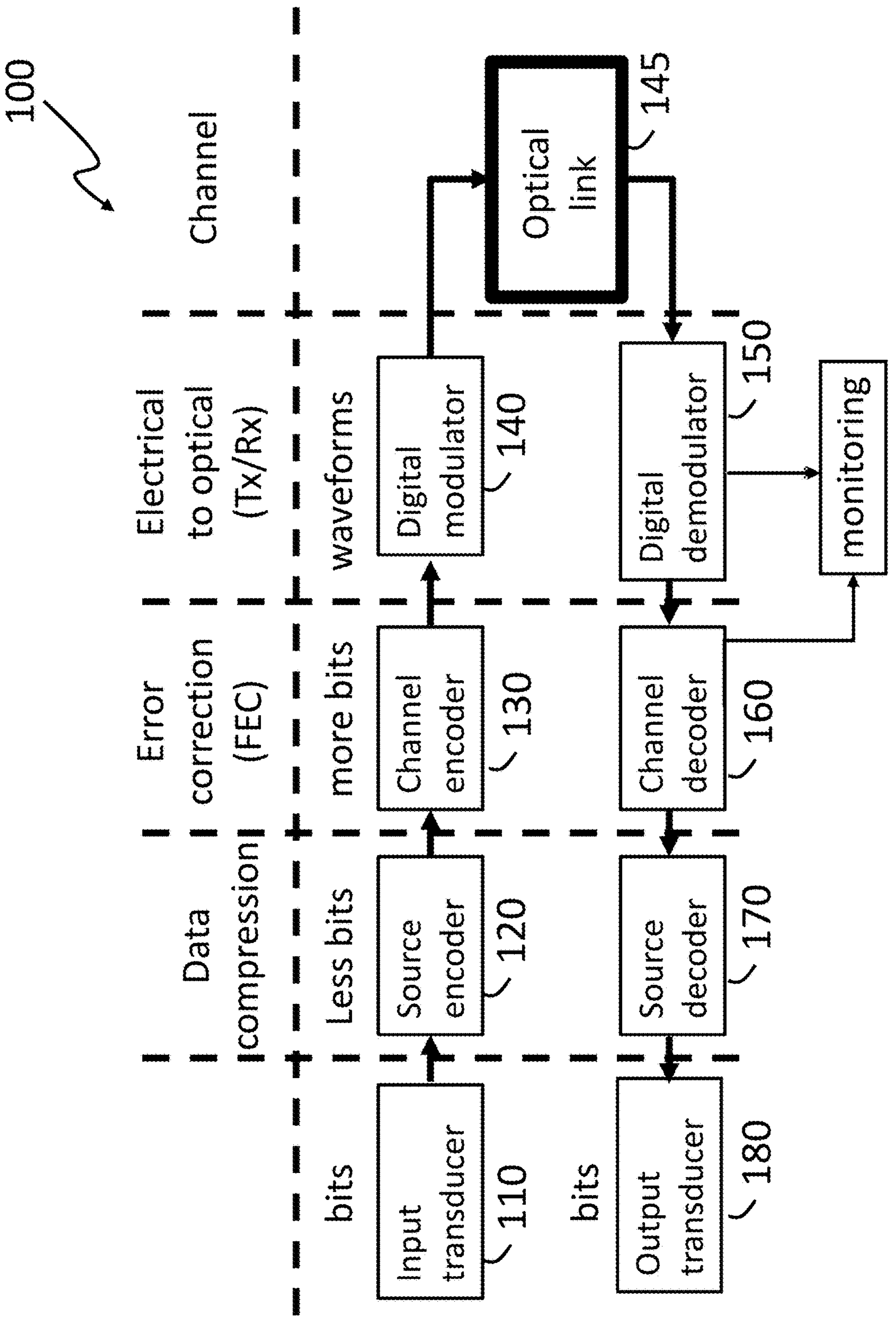
FIG. 1 show a functional diagram of a digital communication system 100 based on optical links according to an example.

FIG. 1 show a functional diagram of a digital communication system 100 based on optical links.

The digital communication system 100 may include at transmitter side:

- an input transducer 110 that receives input bits;
- a source encoder 120 that performs data compression on the input bits to generate a compressed sequence of bits;
- a channel encoder 130 that performs forward error correction to generate error correction bits added to the compressed sequence of bits to generate a sequence of bits to be transmitted;
- a digital modulator 140 that converts the sequence of bits to be transmitted into waveforms using modulations to generate a modulated optical signal transmitted via an optical link 145.

The digital communication system may include at receiver side:

- a digital demodulator 150 that converts a modulated optical signal into a sequence of bits; the signals produced by the digital demodulator 150 may be used for performing monitoring, e.g. monitoring of the performance of the optical link 145;
- a channel decoder 160 that decodes the sequence of bits using error correction bits to generate a decoded sequence of bits; the channel decoder may generate pre-FEC bit errors that may be used for monitoring purposes;
- a source decoder 170 that performs data decompression on the decoded sequence of bits to generate a sequence of output bits;
- an output transducer 180 that receives the sequence of output bits;
- When an event causes a fluctuation of the optical link performance (e.g. a fluctuation of a quality of transmission, QoT, or a fluctuation of any other quantity measured by the coherent optical receiver), it may be desirable to locate the cause of the event, i.e. point out which network element is responsible for this event. However, since the coherent optical receiver itself is the measurement instrument, the cause of the event in the optical link could be hidden either within the "channel" (i.e. physically issued by a component along the optical link such as amplifiers, fibres etc.), or within the "transponder" (i.e. physically linked to the optical transmitter or optical receiver itself and not the optical link components).

For example, a QoT drop (Q-drop) caused by a malfunction of the channel could be provoked by a temporary additional attenuation of some optical fibre in an optical link (e.g. caused by some bending or twist of the optical fibre), some amplifier gain fluctuation (e.g. caused by a fluctuation of the pump laser of an amplifier along the line at transmitter side), some other issue related to a node optical cross-connect etc. On the contrary, a QoT drop caused by a malfunction of the transponder, could be the result of a transponder fault (e.g. some issue with the transmitter laser or the transmitter DAC) or a optical receiver fault (e.g. some issue with the optical receiver local oscillator or some artifact of the optical receiver DSP).

Beside a potential distinction between events having their cause in the channel or in the transponder, it is desirable to determine which of the measurements of optical link performance generated by the optical receiver are unreliable. This determination may be based on an accumulated chromatic dispersion of an optical signal transmitted through the considered optical link.

Figure 2:
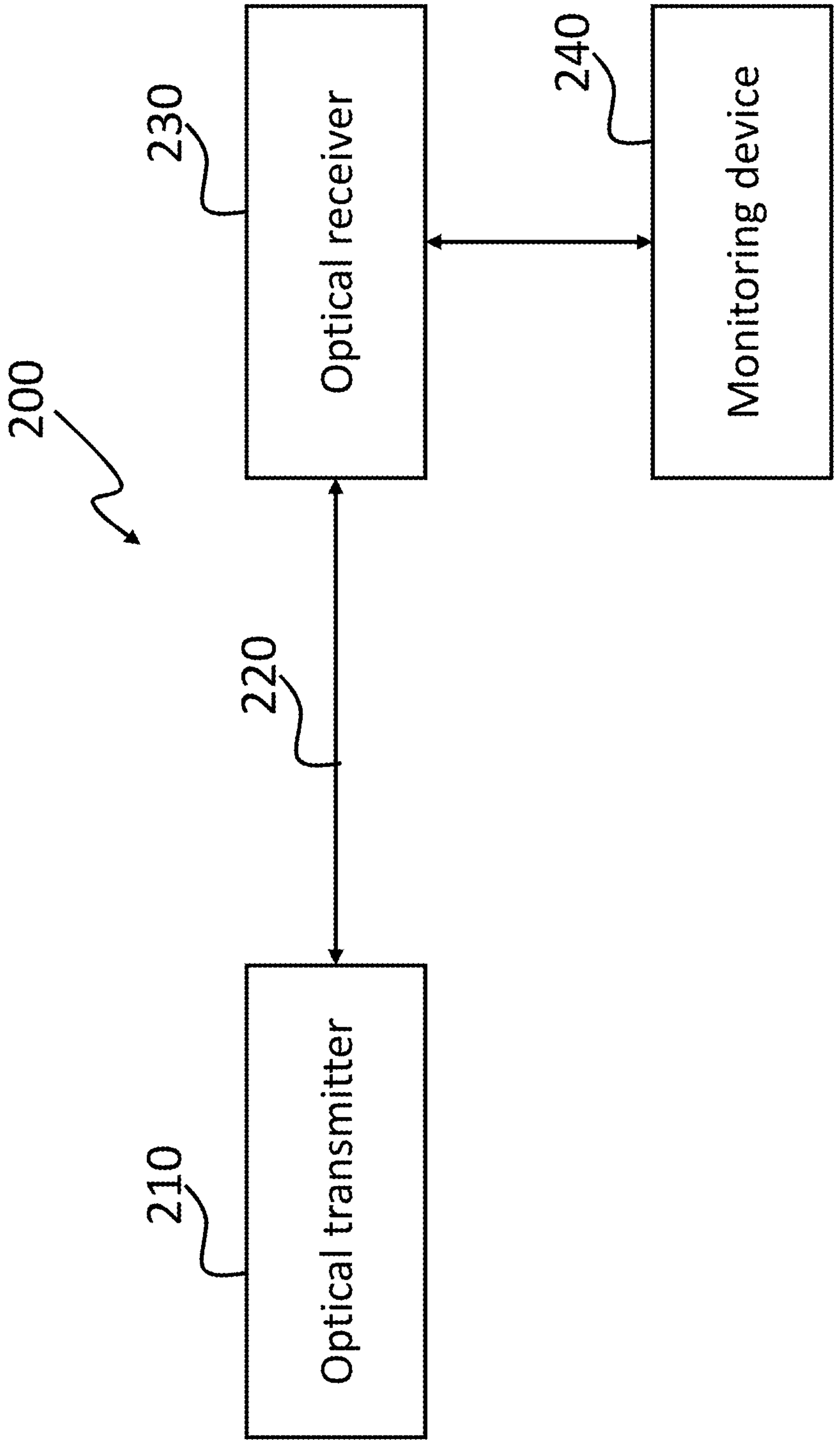
FIG. 2 illustrates an optical network including a optical receiver and an optical network monitor according to an example.

FIG. 2 illustrates an optical network 200 including an optical transmitter 210 and an optical receiver 230 (e.g. a coherent optical receiver) interconnected through an optical link 220 for transmission of an optical signal. The optical receiver 230 is connected to an optical network monitor 240 (also referred to herein as the monitoring device 240). In alternative embodiments (not represented by FIG. 2), the optical receiver 230 may include the optical network monitor 240 or may include one or more monitoring functions of an optical network monitor 240.

As used herein, an "optical network monitor" may refer to a network entity to which data is transmitted for analysis, which has a view of at least a part of the network and is configured to perform one or more monitoring task(s). This can be for example a network controller or a sub-system/sub-entity implemented in software within any other network entity.

In one or more embodiments, estimates of the accumulated chromatic dispersion of the optical signal may be obtained at one or more times from the optical network 200, e.g. by the optical network monitor 240 from the optical receiver 230. The estimates of the accumulated chromatic dispersion are analysed, for example to determine a rate of change of the accumulated chromatic dispersion of the optical signal transmitted through the optical link 220.

The coherent optical receiver generates measurements, e.g. measurements of optical link performance for the optical link. The coherent optical receiver may act as a optical network monitor for such measurements or be configured to send measurements to a network entity (e.g. a network controller) including a optical network monitor or a monitoring function or monitoring device.

In various embodiments described in this application, determining that the measurements of optical link performance are unreliable at given times may be based on a determination that the estimates indicate the accumulated chromatic dispersion of the optical signal varied at the given times at a rate that is above a threshold. Due to various latencies in the optical receiver, exact temporal correspondence between the measurements of optical link performance and the estimates of the CD might be difficult to determine and thus, in various embodiments of this application, a time window may be configured to determine if a temporal correspondence exists or not. This means for example that when measurements of optical link performance made at the coherent optical receiver are received for respective timestamps, identifying that a measurement is unreliable may be done in response to determining that the estimates indicate the accumulated chromatic dispersion of the optical signal varied at an above threshold rate near (i.e. within a time window including) a time corresponding to the concerned measurement of optical link performance, i.e. within a time window including the timestamp associated with the concerned measurement. Equivalently, identifying that one of measurements is unreliable may be done in response to determining that the associated timestamp falls in a given time window including a time at which the estimates indicate the accumulated chromatic dispersion of the optical signal varied at an above threshold rate.

Based on this, it is therefore possible to identify (e.g. tag) portions of the monitored timeseries of measurements which may contain artifacts. These artifacts may be due to a (e.g. temporary) bias introduced by the optical receiver, e.g. by readjustment of the optical receiver adaptive filters. The portions of the timeseries which are tagged as unreliable may be either discarded or analysed with caution or be submitted to a further analysis.

This identification of unreliable portions may be applied to any type of measurements obtained for an optical link that may be affected by such a temporary bias introduced by the optical receiver.

For example, such measurements of optical link performance may include values of one or more parameters such that:

- bit error rates (BER);
- error vector magnitudes (EVM);
- a number of bit errors,
- an uncorrected block error;
- an uncorrected block error rate.

For example, such measurements of optical link performance may be indicative of a characteristic type such as: a pre-FEC bit-error-rate, a rate of change of the pre-FEC bit-error-rate, a post-FEC bit-error-rate, a rate of change of the post-FEC bit-error-rate, a cycle slip rate.

Also, other measurements not directly related to optical link performance may be affected. Such measurements may include: differential group delay rate status status, polarization dependent loss, frequency offset measurement, variation of the state of polarization, polarization mode dispersion (PMD), etc.

Figure 3:
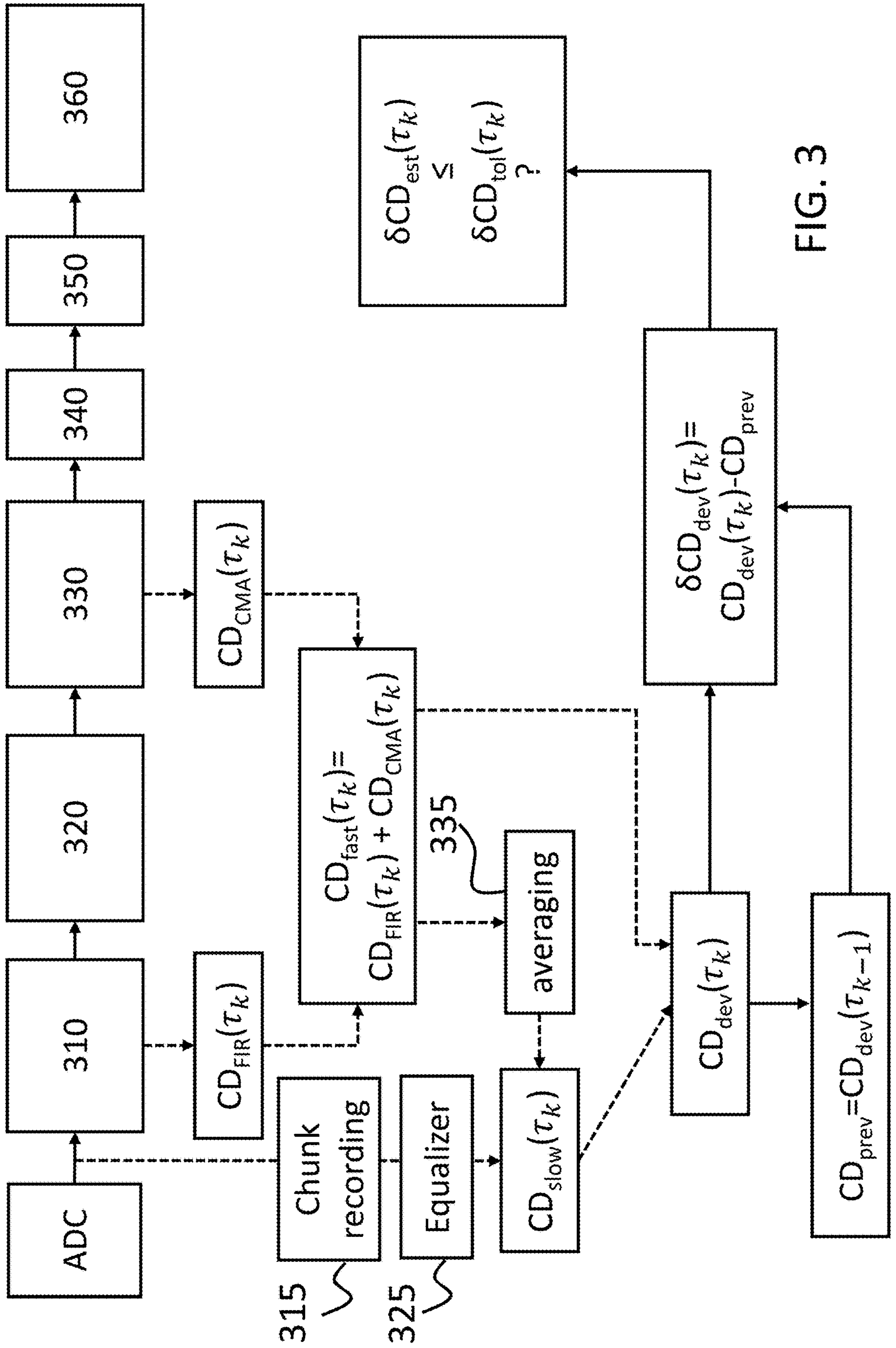
FIG. 3 illustrates a method for estimating the accumulated chromatic dispersion (CD) of an optical signal received by an optical receiver according to an example. The method may be used by the optical network monitor disclosed by reference to FIG. 2.

FIG. 3 illustrates a method for estimating the accumulated chromatic dispersion (CD) of an optical signal received by an optical receiver.

The optical receiver includes a digital signal processing chain after the analog-to-digital converter. The digital signal processing chain includes an equalizer that is configured to perform various corrections such as for example:

- compensating a portion of the accumulated chromatic dispersion of the input digital signal;
- recovering the polarizations using a polarization demultiplexing filter;
- correcting the residual chromatic dispersion;
- perform other corrections like to compensate the roll-off of the spectral shape filter (pulse shaping) or to recover the global rotation, etc.

In an example, the digital signal processing chain may include the following blocks:

- a chromatic dispersion (CD) compensation filter 310 (e.g. including a Finite Impulse Response, FIR, filter) that compensates the main portion of the accumulated chromatic dispersion of the input digital signal;
- a clock recovery block 320 that extracts the correct timing from the received signal; the clock recovery block 320 may be positioned before or after the CD compensation filter 310;
- a digital equalizer 330 that receives a dual-polarization signal carrying a polarization component having a first polarization and a polarization component having a second polarization and separates the signal components in the two polarizations; in this context, a polarization demultiplexing filter may be used to rotate the received signal components for recovering the initial polarization components as multiplexed in the transmitter and/or for removing interferences between the two polarization components;
- a carrier frequency estimation, CFE, block 340 used for estimating the carrier frequency offset;
- a carrier phase estimation, CPE, block 350 used for determining a phase offset;
- a symbol decision block 260 for deciding on the most probable transmitted symbol The CD compensation filter 310 may work as follows. If an accumulated chromatic dispersion D·z is modelled by the multiplication of the signal spectrum by the transfer function $$G_{CD}(z,\omega)=\exp\left(-j\frac{Dz\lambda^2\omega^2}{4\pi c}\right),$$

compensating for the accumulated chromatic dispersion D·z may consist in multiplying the signal spectra of both polarizations with $$G_{CD,comp}(z,\omega)=\exp\left(j\frac{Dz\lambda^2\omega^2}{4\pi c}\right).$$

The accumulated chromatic dispersion to compensate can be blindly estimated from the received signal. An example method for compensating CD is disclosed in C. Xie, "Chromatic Dispersion Estimation for Single-Carrier Coherent Optical Communications," Photonics Technology Letters, IEEE, vol. 25, no. 10, pp. 992-995, 2013.

In embodiments, the digital equalizer 330 may also include the CD compensation filter 310.

An estimate $CD_{est}(\tau_k)$ of the accumulated chromatic dispersion (CD) of the optical signal may be determined at a given time $\tau_k$ (k being the time index) based on at least one of:

- The output signal $CD_{FIR}(\tau_k)$ of the CD compensating filter 310 at time $\tau_k$;
- The output signal of the digital equalizer 330, this filtered signal being noted $CD_{CMA}(\tau_k)$ at time $\tau_k$;

For example, an estimate $CD_{est}(\tau_k)$ of the accumulated chromatic dispersion at the time $\tau_k$ may be computed as $$CD_{est}(\tau_k)=CD_{FIR+CMA}(\tau_k)=CD_{FIR}(\tau_k)+CD_{CMA}(\tau_k)$$

or $$CD_{est}(\tau)=CD_{FIR}(\tau_k)$$

This allows a fast monitoring of the accumulated CD: a new value of $CD_{est}(\tau_k)$ may be obtained every second or fraction of second based on one or more optical signals acquired at the time $\tau_k$ by the optical receiver. This monitoring of the cumulative CD may be performed in real time.

The variations over time of the estimate of the accumulated CD are analysed. For example the quantity $\delta CD_{dev}(\tau_k)=CD_{dev}(\tau_k)-CD_{dev}(\tau_{k-1})$ representing a rate of change of the estimate of the accumulated CD is computed to determine the variation of the estimate of the accumulated CD at time $\tau_k$.

The rate of variation $\delta CD_{dev}(\tau_k)$ of the estimates of the accumulated CD deviation is compared to a threshold, also referred to herein as the tolerance threshold $\delta CD_{tol}(\tau_k)$. This rate of variation (also referred to as the rate of change) may be computed by comparing successive estimates of the accumulated CD. This may be performed for example, by computing an amplitude difference between two successive estimates or by computing a derivative of variations of the estimates of the accumulated CD.

In one or more embodiments, the estimate of the accumulated chromatic dispersion at the time $\tau_k$ may be complemented based on a reference accumulated CD $CD_{slow}(\tau_k)$ for the optical signal.

The reference accumulated CD is useful to potentially explain variations of the estimates of the CD $CD_{est}(\tau_k)$ because of true accumulated CD variations due to temperature variations or rerouting. This therefore reduces the number of false alarms.

Example 1: because of a rerouting or important temperature difference we get $\delta CD > CD_{tol}$, followed by both slow and fast measurements $$CD_{CMA+FIR}(\tau_{l+1}) = CD_{CMA+FIR}(\tau_l) + \delta CD \text{ and}$$
$$CD_{slow}(\tau_{l+1}) = CD_{slow}(\tau_l) + \delta CD.$$

In this case $$CD_{dev}(t_{l+1}) = CD_{CMA+FIR}(t_l) + \delta CD - CD_{slow}(t_l) - \delta CD = CD_{CMA+FIR}(t_l) - CD_{slow}(t_l) = CD_{dev}(t_l) \Rightarrow \delta CD_{dev}(t_{l+1}) = CD_{dev}(t_{l+1}) - CD_{dev}(t_l) = 0 < CD_{tol},$$

i.e. the estimates of accumulated CD follow the reference accumulated CD: no alarm is raised, measurements are not tagged as potentially biased and the optical link can be the cause of a Q-drop or anything else.

Example 2: only $CD_{fast}$ changes and $CD_{slow}$ remains constant, e.g.

$$CD_{CMA+FIR}(\tau_{l+1}) = CD_{CMA+FIR}(\tau_l) + \delta CD \text{ and}$$
$$CD_{slow}(\tau_{l+1}) = CD_{slow}(\tau_l).$$

In this case $$CD_{dev}(t_{l+1}) = CD_{CMA+FIR}(t_l) + \delta CD - CD_{slow}(t_l) = CD_{dev}(t_l) + \delta CD \Rightarrow \delta CD_{dev}(t_{l+1}) = CD_{dev}(t_{l+1}) - CD_{dev}(t_l) = \delta CD > CD_{tol},$$

i.e. the deviation of the estimates of accumulated CD cannot be justified by the reference accumulated CD. Thus, an alarm may be raised and corresponding samples of the optical signal may be tagged as erroneous. The optical receiver can be the cause of a Q-drop.

The reference accumulated CD may be obtained by a slow, but more accurate, monitoring of the accumulated CD compared to $CD_{FIR}(\tau_k)$ or $CD_{CMA}(\tau_k)$: a new value of $CD_{slow}(\tau_k)$ may be obtained by default, e.g. every several tens of minutes or even hours. A new value of $CD_{slow}(\tau_k)$ may also be determined whenever there is a change in the network, for instance when the communication channel is rerouted through a different physical path.

The reference accumulated CD $CD_{slow}(\tau_k)$ may be obtained from a) a chunk recording 315 and equalizer 325 applied to the input optical signal; and/or b) an averaging function 335 applied to the estimates $CD_{est}(\tau_k)$ of the accumulated CD.

The averaging function 335 may be a FIR filter, median function, arithmetical average, etc. The output of the averaging function 335 may be computed over a long period after the establishment of the connection.

The equalizer 325 may be a dedicated equalizer that is adapted for CD monitoring, for example by increasing the number of iterations of the equalization algorithm (e.g. CMA) to improve its convergence.

For example, an estimate $CD_{estdev}(\tau_k)$ of the deviation of accumulated chromatic dispersion from the reference at the time $\tau_k$ may be computed as $$CD_{dev}(\tau_k) = CD_{FIR}(\tau_k) + CD_{CMA}(\tau_k) - CD_{slow}(\tau_k)$$

or $$CD_{dev}(\tau_k) = CD_{FIR}(\tau_k) - CD_{slow}(\tau_k)$$

using the reference accumulated chromatic dispersion $CD_{slow}(\tau_k)$.

The reference accumulated CD $CD_{slow}(\tau_k)$ is used to correct a potential variation of the true accumulated chromatic dispersion of the optical link, due to temperature and/or pressure variations, in the estimates of the cumulative CD. For example, when there is no temperature variations or change of the physical path (i.e. rerouting), the term $CD_{slow}(\tau_k)$ may be constant for successive values of $CD_{FIR}(\tau_k)$ or successive values of $CD_{CMA}(\tau_k)$ such that the rate of change of $CD_{est}(\tau_k)$ is only due to the rate of change of $CD_{FIR}(\tau_k)$ and/or $CD_{CMA}(\tau_k)$.

While the coherent optical receiver performs blind equalization of the incoming optical signal, when the coherent optical receiver is used as a monitoring (or measurement) device, the fluctuations of the true (i.e. not biased) accumulated CD of an established, stable optical link (corresponding to a light path), should be physically constrained by the fluctuations of the CD induced by the environmental conditions. For instance, temperature and pressure have an impact on the dispersion parameter of the optical fibres and therefore on the true accumulated CD induced to the optical signal by propagation. Therefore, deviations of the accumulated CD measured by coherent optical receivers which are physically impossible, i.e. non-explainable within the given temperature and/or pressure constraints, may be attributed to some artifact or bias introduced by the optical receiver. This optical receiver bias may be also confirmed by the fact that such deviations are usually temporally constrained in time (something like a "glitch" of the optical network monitor), while acquisition of normal monitoring values is resumed after a while. As a consequence the variations over time of the true accumulated CD of a particular optical link is upper-bounded by a threshold representative of the impact of variations of physical properties of fibre glass, e.g. temperature or pressure variations, on the accumulated CD. Therefore, variations over time of $CD_{est}(\tau_k)$ which cannot be justified by the laws of physics and a corresponding fluctuation of temperature or pressure (e.g. provided by dedicated or meteorological sensors of general use) leads to a violation by the variations over time of the accumulated CD of the inequality based on the upper threshold (i.e. the tolerance threshold).

If the rate of the variations of the accumulated CD is above the upper threshold at given times, this indicates a temporary bias of the optical receiver. Such a bias may be due to a non-ideal convergence of the polarization demultiplexing adaptive filters. When violation of the inequality based on the upper threshold is detected for given times, the corresponding temporal portion of the optical receiver-based measurement timeseries (such as the pre-FEC BER) may be tagged as being "potentially biased" and may be either discarded or used with great caution.

The quantity $CD_{dev}(\tau_k)=CD_{FIR}(\tau_k)+CD_{CMA}(\tau_k)-CD_{slow}(\tau_k)$ represents an (e.g. real-time) estimate of accumulated CD deviation with respect to the reference accumulated CD $CD_{slow}(\tau_k)$, while the quantity $CD_{slow}(\tau_k)$ used as reference accumulated CD may be computed at a lower speed compared to $CD_{FIR}(\tau_k)+CD_{CMA}(\tau_k)$.

Whatever the method used to compute the estimates $CD_{est}(\tau_k)$ of the accumulated CD, the quantity $\delta CD_{dev}(\tau_k)\approx CD_{dev}(\tau_k)-CD_{dev}(\tau_{k-1})$ may be used to approximate differentiation (i.e. the derivative of the $CD_{est}(\tau_k)$ with respect to time) and analyse the variations of the accumulated CD with respect to a tolerance threshold $\delta CD_{tol}(\tau_k)$. A quantity $\delta CD_{est}(\tau_k)$ represents a variation rate with respect to time of the accumulated CD. This variation rate may be compared to the tolerance threshold $\delta CD_{tol}(\tau_k)$.

In alternative embodiment, if the tolerance threshold $\delta CD_{tol}(\tau_k)$ is configured to follow temperature variations, there is no need for the quantity $CD_{slow}(\tau_k)$ used as reference accumulated CD. However, adjusting the tolerance threshold would require: the exact topology to account for the different fiber type, the exact length of each fiber so that an estimate of the reference accumulated chromatic dispersion can be calculated, datasheet information and more particularly the dependence of each fiber with temperature, some sensors (or meteorological information) to get the temperature variation in a specific time frame and then calculate accordingly tolerance threshold which incorporates what is believed to be the normal CD variation.

Then, a bias caused by the optical receiver on measurements of optical link performance may be detected. The measurements of optical link performance may be tagged using binary flags $R_{bias}(\tau_k)$, where a binary flag $R_{bias}(\tau_k)$ is equal to a given binary value when the variation rate is over the tolerance threshold at time $\tau_k$. A binary flag vector may be defined as $$R_{bias}(\tau_k)=\begin{cases}0, & \bigcup_{k-m}^{k+m}[\delta CD_{dev}(\tau_k)>\delta CD_{tol}(\tau_k)]\\ 1, & \bigcup_{k-m}^{k+m}[\delta CD_{dev}(\tau_k)\le \delta CD_{tol}(\tau_k)]\end{cases}$$

where the time instants $\tau_k$ for which $R_{bias}(\tau_k)=0$ indicate that the optical receiver measurements are unreliable (i.e. not trustworthy), or reliable otherwise. The integer m denotes a "memory length parameter" which may be used to tag as corrupted not only the exact time instants for which the deviation of the variation rate is detected but also some instants before and after. This memory length parameter may be useful when the monitored quantities are not exactly synchronous. For instance, in one or more embodiments, the value m may be to set m=1, when the closest neighbouring samples in time before and after the one(s) which was (were) tagged as biased will also be tagged as biased.

Finally, for given a monitored timeseries vector k(τ) including a temporal sequence of measurements of optical link performance, a pointwise multiplication of k(τ) with the vector $R_{bias}(\tau)$ for the same timeframe can be used to remove the biased portions of the temporal sequence.

Examples embodiments for monitoring the accumulated CD based on outputs obtained from different locations of a digital signal processor (DSP) of a coherent optical receiver as shown in FIG. 3 are described with more details.

A real-time (fast) monitoring of the accumulated CD with limited-accuracy may be obtained as $CD_{fast}(\tau_k)=CD_{FIR+CMA}(\tau_k)=CD_{FIR}(\tau_k)+CD_{CMA}(\tau_k)$, achieved by reading at a time instant $\tau_k$ the bulk accumulated CD compensated $CD_{FIR}(\tau_k)$ by the finite impulse response (FIR) filter 310, added to the extra compensated CD $CD_{CMA}(\tau_k)$ by the equalizer 330 (e.g. using the constant modulus algorithm, CMA, or another algorithm like the least mean square equalizer (LMSE) with learning sequences). This can be performed as described for example in document "Optical link performance Monitoring in Digital Coherent Receivers," by F. N. Hauske, M. Kuschnerov, B. Spinnler, and B. Lankl, IEEE/OSA Journal of Lightwave Technology, vol. 27, no. 16, pp. 3623-3631, 2009.

This procedure may offer limited accuracy for the monitoring of the CD since the DSP in the optical receiver may be optimized with the primary target of signal blind equalization in real-time and the DSP is not necessarily optimized for high-accuracy monitoring of the fibre-optic channel parameters. As a consequence, the adaptive filter convergence requirements are relaxed to accommodate other requirements e.g. in terms of latency, memory, CPU, consumption, design etc.

The estimates $CD_{fast}(\tau_k)$ may be sent from the optical receiver to an optical network monitor (such as a network controller) or the separate estimates $CD_{FIR}(\tau_k)$ and $CD_{CMA}(\tau_k)$ may be sent to the optical network monitor and combined by optical network monitor later to calculate the sum $CD_{FIR+CMA}(\tau_k)$. Also rate of changes of the estimate $CD_{fast}(\tau_k)$ may be sent from the optical receiver to the optical network monitor or may be computed by the optical network monitor based on the received estimates $CD_{fast}(\tau_k)$.

A slow high-accuracy monitoring of the accumulated CD, $CD_{slow}(\tau_k)=CD_{CR}(\tau_k)$ used as reference accumulated CD may be obtained by processing a chunk recording (CR) 315 (i.e. a snapshot of input samples of the distorted signal) e.g. of tens of thousands complex samples per polarization extracted after the analog to digital front-end (i.e. after the ADC in FIG. 3), on which a digital signal processing (DSP) block (e.g. an equalizer 325) is applied to generate an estimate of the accumulated CD with the highest possible accuracy. The CR 315 and equalizer 325 could also be introduced after the ADC or any other stage of the processing chain (e.g. right after the first filter 310), provided that the filters applied up to this point are known and taken into account for estimating the accumulated CD.

In embodiments where a reference accumulated CD $CD_{slow}(\tau_k)$ is used, the computation of $CD_{slow}(\tau_k)$ based on a CR may be done in-situ by the coherent optical receiver hardware or alternatively the input digital samples may be sent to the optical network monitor and be processed by the optical network monitor to generate $CD_{slow}(\tau_k)=CD_{CR}(\tau_k)$. The optical network monitor may also decide when a new chunk recording is required and trigger the optical receiver to produce and send the new CR to the optical network monitor. This can be done for instance when a communication channel is rerouted through a different physical path.

Since sending the new samples takes time and the computation of the $CD_{slow}(\tau_k)=CD_{CR}(\tau_k)$ is also a lot slower compared to $CD_{FIR+CMA}(\tau_k)$, the reference accumulated CD $CD_{slow}(\tau_k)=CD_{CR}(\tau_k)$ is available less frequently compared to the $CD_{FIR+CMA}(\tau_k)$ estimate. In this case, the last value of the reference accumulated CD may be used, i.e. $CD_{CR}(\tau_k)=CD_{CR}(\tau_{k-1})$.

The determination of the reference accumulated CD involving a CR may be performed with a fixed periodicity (e.g. every 5-30 minutes) or may be optionally triggered externally. This external triggering may happen as the result of a calculation involving the reading of external temperature sensors or the local weather forecast accompanied by calculations of the temperature of the fibre itself compared to its surrounding environment, signalling indicating that the light path in question has just been rerouted through a different physical path (e.g. after optical restoration), or any other legitimate suspicion that the channel has significantly changed since the last chunk recording. For instance, if the estimated average temperature along the light path at a given time instant $t_k$ is $\widehat{T(\tau_k)}$, and for the previous time instant $\tau_{k-1}$ is $\widehat{T(\tau_{k-1})}$, if $|\widehat{T(\tau_k)}-\widehat{T(\tau_{k-1})}|>\delta T_{res}$ where $\delta T_{res}$ is the temperature resolution (e.g. $\delta T_{res}=0.5°$ C.) and/or if the path has been rerouted, then a new CR may be triggered with a consequent measurement $CD_{CR}(\tau_{k+1})$, otherwise CR is not triggered and the previous $CD_{CR}$ measurement is maintained, i.e. $CD_{CR}(\tau_{k+1})=CD_{CR}(\tau_k)$.

In one or more embodiments, the differential temperature measurement $\widehat{T(\tau_k)}-\widehat{T(\tau_{k-1})}$ may be used to calculate for each time the threshold $$\delta CD_{tol}(\tau_k)=\frac{dD_{cum}}{dT}(\widehat{T(\tau_k)}-\widehat{T(\tau_{k-1})})$$

that is used as upper bound in the analysis of the variations of the estimates of the accumulated threshold.

Dedicated temperature measurements or by publicly available meteorological data may be used to compute the reference accumulated CD and/or the tolerance threshold $\delta CD_{tol}(\tau_k)$.

In absence of temperature monitoring or in combination with temperature monitoring, average temperature variations for the specific region, publicly available estimations of the temperature variations during the next days or blind worst-case assumptions may be considered. The tolerance threshold $\delta CD_{tol}(\tau_k)$ may correspond to the deviation of accumulated CD which is explainable at some time instant $\tau_k$ by some temperature change. By using chunk recording for recording samples of the optical signal, the fluctuations of CD due to temperature changes are absorbed and the tolerance can be adjusted independently, using a small constant.

In one or more embodiments, the tolerance threshold $\delta CD_{tol}(\tau)$ may be computed using fibre datasheets. The tolerance threshold $\delta CD_{tol}(\tau_k)$ may be computed based on one or more parameters in the set including

- measurements for the temperature derivative of the light path fibres $$\frac{dD_{cum}}{dT};$$

- the number of fibres of the specific light path and/or their lengths;
- the central wavelength of the optical channel used for monitoring.

To avoid false positives, $\delta CD_{tol}$ may be set higher than the intrinsic uncertainty of the $CD_{CR}$ measurement (any deviation below makes no sense).

Discarding unreliable (e.g. "possibly corrupted") portions of the temporal sequences of measurements at a coherent optical receiver that received the optical signal contributes to a more meaningful analysis and interpretation of the remaining ("clean") portions of the monitored measurements. The optical receiver may be operating nominally concerning its "optical receiver duties" (i.e. with a BER below the FEC threshold) during both "biased" and "unbiased" portions of time. However, during the "biased" portions the optical receiver may not be delivering trustworthy monitoring, due to the violation of the physical constraints. As an example, a weighted bit error rate may be determined for a subset of the measurements of the optical link performance when the measurements of the subset are bit error rates and not determined as being unreliable.

Concerning the physical constraints, the chromatic dispersion parameter of a fibre changes as a function of temperature or pressure due to the fundamental properties of glass. The impact of pressure on the chromatic dispersion parameter is negligible for terrestrial links, but even CD fluctuations versus temperature are not very important for typical fibre-optic systems. For instance, for a fibre with dispersion parameter D=16.82 ps/nm/km at wavelength $\lambda=1550$ nm a chromatic dispersion parameter derivative with respect to the temperature is about $dD/dT\approx-0.002$ ps/nm/km/° C. For a terrestrial link of 20×100 km spans of the same fibre, the derivative of the accumulated CD with respect to temperature T is $dD_{cum}/dT\approx-4$ ps/nm/° C. Using now the fastest temperature change ever recorded officially on earth, i.e. $\Delta T_{extr}=57.2°$ C. rise within a 24 hours period, and considering (in extremis) that a temperature change of $\Delta T_{extr}=57.2°$ C. affects all fibres of the light path route, an accumulated CD difference of $\Delta CD_{extr}=-228.8$ ps/nm may be obtained at most in a day. For several practical reasons, the accumulated CD variations should be much lower than $\Delta CD_{extr}$. Such reasons may be: a) the fact that temperature variations are a lot lower than $\Delta T_{extr}$, e.g. typically, a daily temperature variation is of around 1° C. (for the previous example, one measurement per day would be enough to guarantee an accuracy better than 4 ps/nm), b) fibre insulation reducing effective temperature changes felt by the fibres, c) the fact that most cables are usually buried under ground where temperature is more stable, d) the fact that temperature may not exhibit the same variations all-along the light path route at the same time etc. Nevertheless, there is a high probability of Q-drops appearing at the same time as in the monitored accumulated CD. While, right after rerouting a connection over a different physical path (e.g. due to restoration after a hard failure of a link) the compensated chromatic dispersion may be different with respect to the one compensated during the previous instant (since a different number of fibres of possibly different types and/or lengths may be encountered), for an established, stable light path, such deviations cannot correspond to a physical reality and they can only be interpreted as artifacts of the CD measurement performed by the coherent optical receiver.

Instead of the accumulated CD, the rate of variation (or excursion) of other parameters may be monitored: the DGD/PMD. There is also a high probability of Q-drops appearing at the same time as high rate of variation of the DGD/PMD.

Back-to-back experiments have been done using a commercial optical transmitter and an optical receiver.

We denote $CD_{set}$ the accumulated CD electronically emulated at the transmitter side (representing the true CD of an arbitrary light path); $CD_{FIR}$ is as for FIG. 3 the CD compensated by the compensating FIR filter, $CD_{CMA}$ as for FIG. 3 the additional CD compensated by the digital equalizer and $-e_{FIR+CMA}$ is the residual CD after equalization that is such that $CD_{set}=CD_{FIR}+CD_{CMA}-e_{FIR+CMA}$. We assume that $CD_{set}$ emulates the true CD.

The symbol rate was 45 GBaud and the modulation format was QPSK. Accumulated $CD_{set}$ values between −10000 ps/nm and 10000 ps/nm were used, N=200 estimates of the $CD_{FIR}$ were extracted with an interval of ~30 seconds and 5 estimates of $CD_{CMA}$ were extracted for the same overall period, i.e. once every 40 estimates of $CD_{FIR}$.

Figure 4A:
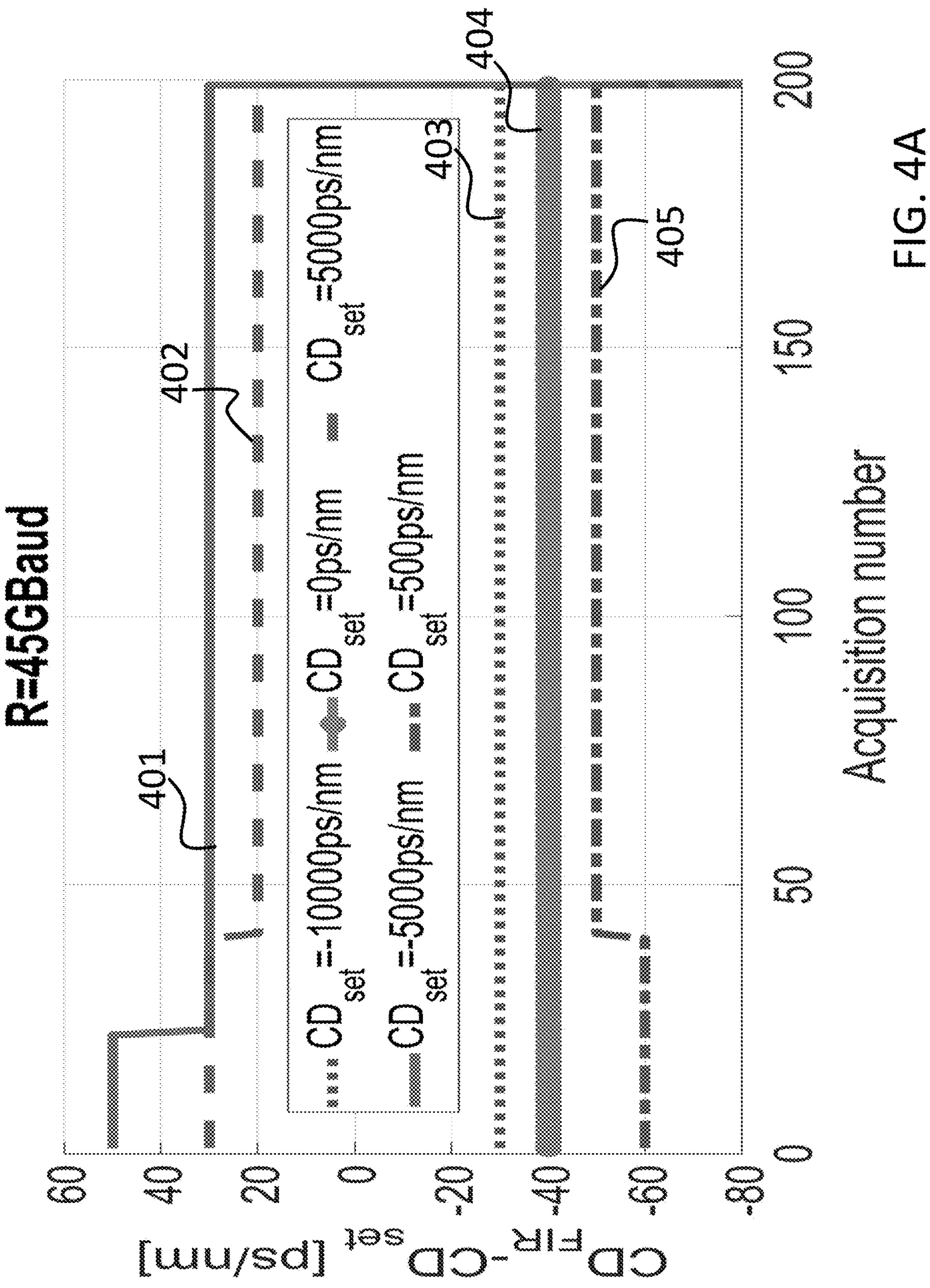
FIG. 4A-4B show experimental results.

FIG. 4A shows variations of the difference $CD_{FIR}-CD_{set}$ as a function of the acquisition number N of the CD measurements for different values of $CD_{set}$. The measurements are repeated N=200 times. The curve 401 corresponds to $CD_{set}=-5000$ ps/nm. The curve 402 corresponds to $CD_{set}=5000$ ps/nm. The curve 403 corresponds to $CD_{set}=-10000$ ps/nm. The curve 404 corresponds to $CD_{set}=0$ ps/nm. The curve 405 corresponds to $CD_{set}=500$ ps/nm.

In FIG. 4A we show that the residual dispersion $-e_{FIR+CMA}$ left after compensation of the CD by the FIR (or equivalently the estimation error if only the $CD_{FIR}$ is used for computing the estimates of the accumulated CD), as a function of the acquisition number. We note that $CD_{FIR}$ fluctuates in time, sometimes presenting jumps of ±10 ps/nm or ±20 ps/nm without any apparent change in the communication system and independently of the emulated $CD_{set}$, yielding a residual uncertainty of accumulated CD estimates based on $CD_{FIR}$ only comprised between −60 ps/nm and +50 ps/nm.

Figure 4B:
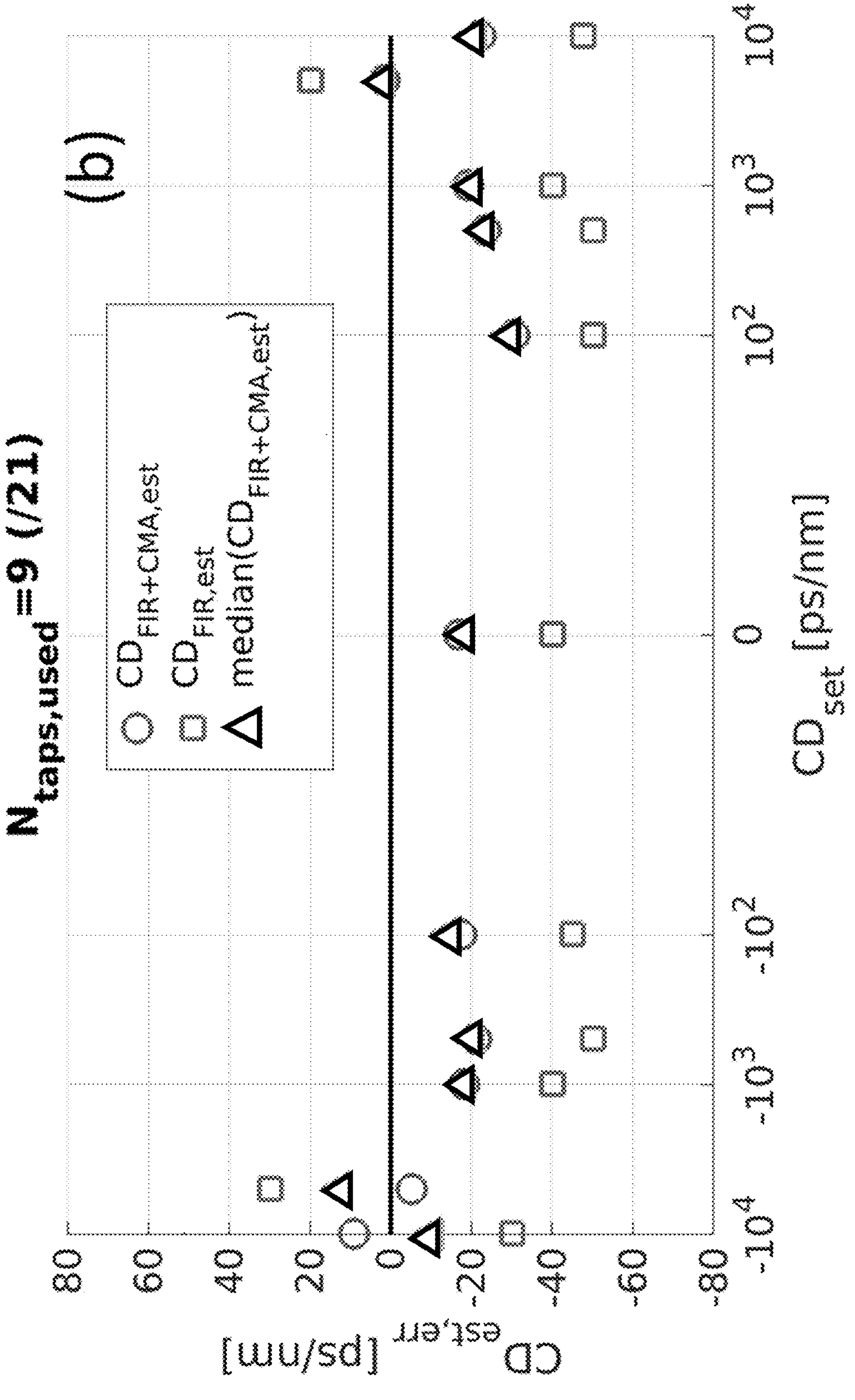

FIG. 4B shows CD estimates as a function of $CD_{set}$ in which

- circle markers represent average $CD_{FIR+CMA}-CD_{set}$ as a function $CD_{set}$,
- squared markers represent average $CD_{FIR}-CD_{set}$ as a function $CD_{set}$;
- triangle markers represent median $CD_{FIR+CMA}-CD_{set}$ as a function $CD_{set}$.

FIG. 4B shows the average $CD_{FIR+CMA}-CD_{set}$ as a function of $CD_{set}$, using the method disclosed in the document by F. N. Hauske et al. (previously cited) to estimate $CD_{CMA}$. FIG. 4B shows that the use of accumulated CD estimates based on the sum $CD_{FIR+CMA}$ helps to reduce the estimation error which is now comprised between +10 ps/nm and −25 ps/nm.

Figure 5A:
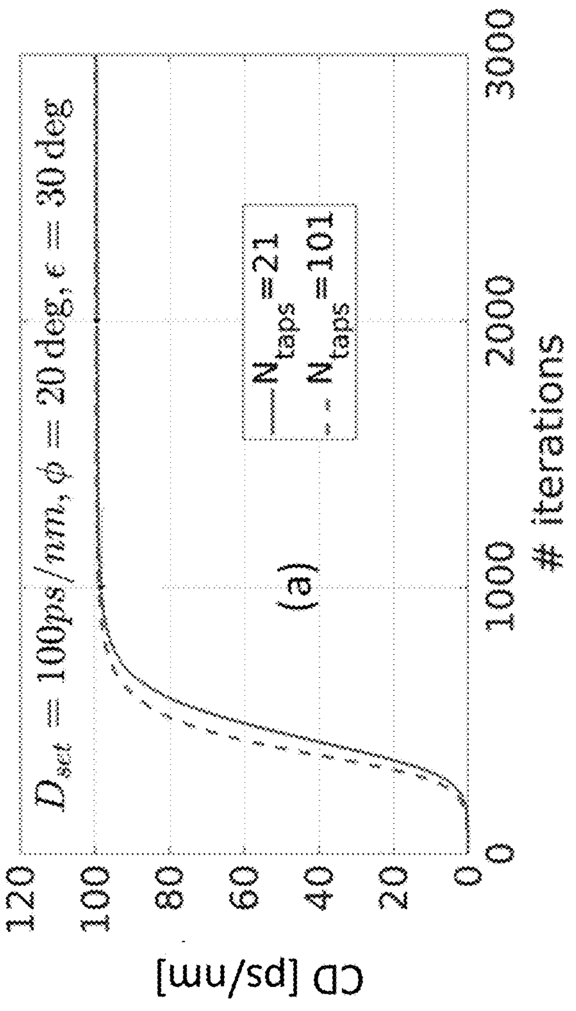
FIG. 5A shows results of numerical simulations.

FIG. 5A shows accumulated CD estimates obtained using the method disclosed in the document by F. N. Hauske et al. (previously cited) as a function of the number of iterations for the convergence of the algorithm in the equalizer. (e.g. using CMA).

FIG. 5A concerns numerical simulations, with an input signal of 65536 symbols with $CD_{set}=100$ ps/nm and a state of polarization with azimuth φ=20° and ellipticity ε=20°, where a standard CMA has been applied with convergence parameter μ=0.01 and 21 taps (solid line) or 101 taps (dashed line) to generate an accumulated CD estimate that can be used as reference accumulated CD $CD_{slow}(\tau_k)$.

In FIG. 5A the input signal has 65536 symbols (emulating a chunk recording), $CD_{set}=100$ ps/nm and an input SOP with azimuth φ=20° and ellipticity ε=30°. We note that after a relatively large number of iterations (above 1000) the accuracy of the monitored CD is better than 0.5 ps/nm, while dramatically increasing the number of CMA taps from 21 (blue solid curve) to 101 (dashed orange curve) may only have an impact in accelerating the CD assessment but not the final value after convergence. However, faster CMA convergence may be required in practical transponder designs due to the constraints of latency and hardware complexity.

Figure 5B:
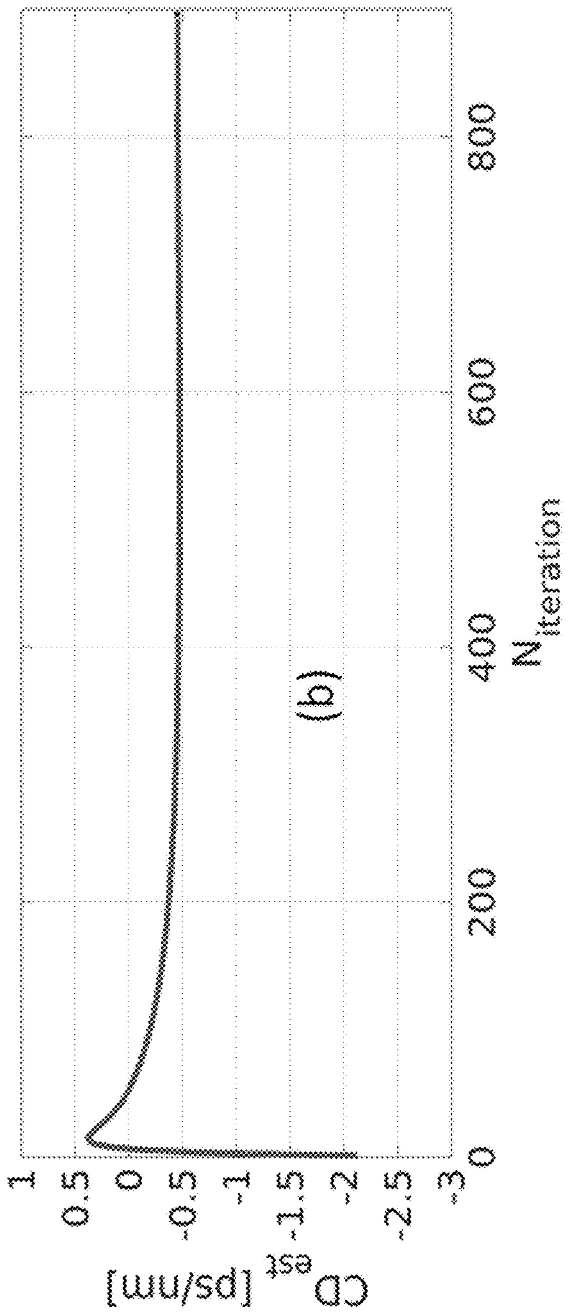
FIG. 5B shows experimental results.

FIG. 5B shows experimental verification with a chunk recording of 43691 complex samples per polarization, $CD_{set}$=Ops/nm and CMA with 21 taps. We can verify the accumulated CD assessment by an experiment with $CD_{set}=0$ ps/nm. The conclusions are qualitatively similar to the numerical simulation showing an excellent accuracy better than 0.5 ps/nm.

Figure 6:
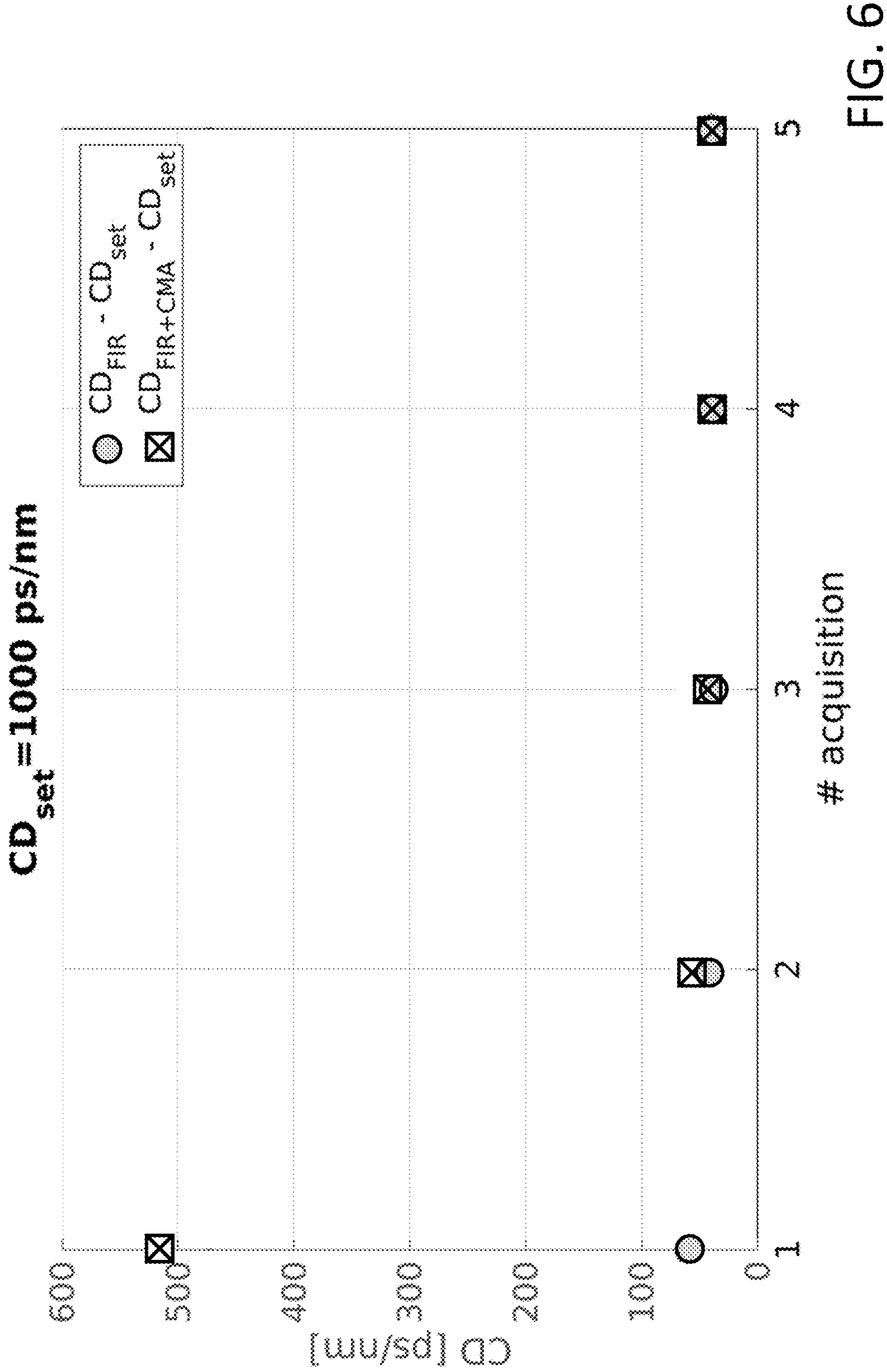
FIG. 6 show experimental results.

FIG. 6 shows residual dispersion (or estimation error of the accumulated CD estimation) as a function of the acquisition number when only the FIR is used (round markers) and when both FIR and CMA are used (square markers) for estimating the CD.

We note that for the first acquisition (temporally close to the $CD_{set}$ transition), the residual dispersion (or estimation error) exhibits a peak of about 500 ps/nm while for the next acquisitions the error is maintained to normal values around 40-50 ps/nm. Assuming that a $CD_{CR}$ measurement would always be very close to Ops/nm, during these particular measurements with a digital emulation of the CD (without any fibre) there is no possible physical explanation of the observed peak other than a temporary adaptation of the optical receiver equalizer filters. We note however that for the previously discussed configuration of 20×100 km, a deviation of 500 ps/nm would have been the result of a temperature fluctuation of about 120° C., i.e. also leading to a violation of the physical constraints.

Figure 7:
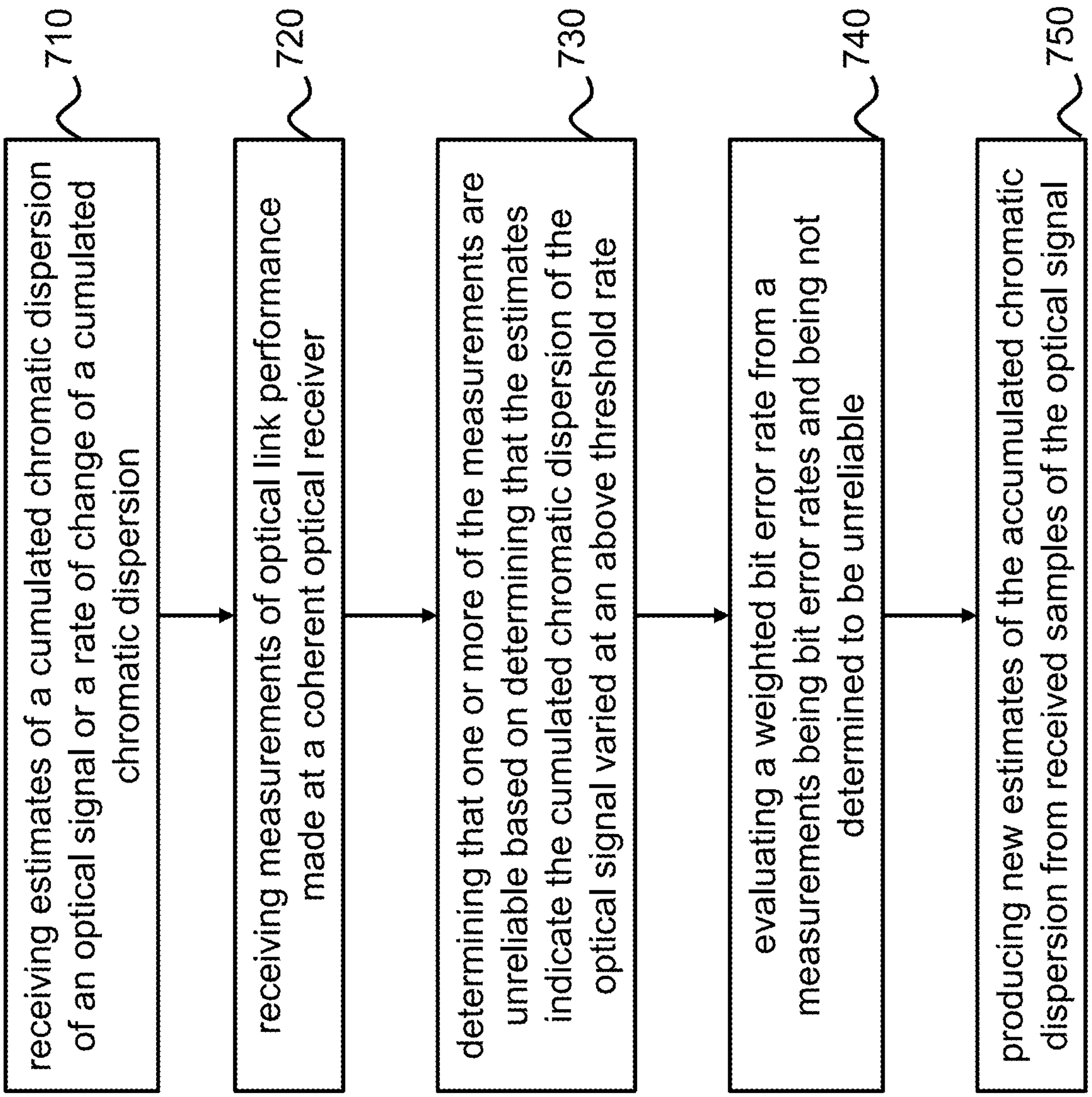
FIG. 7 is a flowchart illustrating a method according to an example. The method may be used by the optical network monitor disclosed by reference to FIG. 2.

FIG. 7 shows a flowchart of a method for use by an optical network monitor according to one or more example embodiments. The steps of the method may be implemented by an optical network monitor according to any example described herein.

While the steps are described in a sequential manner, the man skilled in the art will appreciate that some steps may be omitted, combined, performed in different order and/or in parallel.

In step 710, estimates of an accumulated chromatic dispersion of an optical signal or a rate of change of said accumulated chromatic dispersion are received from an optical network. The estimates may be indicative of measurements at a coherent optical receiver that received the optical signal from an optical link of the optical network at a sequence of times.

In step 720, measurements of optical link performance made at the coherent optical receiver are received from the optical network, in response to recovering data carried by the optical signal.

In step 730, one or more of the measurements of optical link performance may be identified as being unreliable in response to determining that the estimates indicate the accumulated chromatic dispersion of the optical signal varied at an above threshold rate near a time corresponding to said at least one of the measurements of optical link performance. For example, a determination is made that one or more of the measurements of optical link performance are unreliable at one or more times of the sequence based on determining that the estimates indicate the accumulated chromatic dispersion of the optical signal varied at an above threshold rate at the one or more times of the sequence. The threshold used for the analysis of the rate of change of the accumulated chromatic dispersion may be the tolerance threshold as disclosed herein.

In step 740, a weighted bit error rate may be evaluated from a subset of the measurements of the optical link performance, when these measurements of optical link performance are bit error rates and are not determined to be unreliable in step 730. Discarding measurements that are not reliable allows to get a more accurate bit error rate.

In step 750, producing new estimates ($CD_{slow}(\tau_k)$) of the accumulated chromatic dispersion may be produced either from received estimates $CD_{est}(\tau_k)$ of the accumulated chromatic dispersion (e.g. using an averaging function 335) or from received samples of the optical signal (e.g. using chunk recording 315 and equalizer 325 as disclosed herein) by operating a digital equalizer 325 with the received samples.

These new estimates ($CD_{slow}(\tau_k)$) may be used as values of the reference accumulated chromatic dispersion as defined herein and used for computing rates of change $\delta CD_{dev}(\tau_k)$ of the accumulated chromatic dispersion complemented by this reference accumulated optical dispersion as disclosed herein.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host device or host system. The instructions may be transmitted over the computer-readable medium and be loaded onto the host device or host system. The instructions are configured to cause the host device or host system to perform one or more functions disclosed herein. For example, as mentioned above, according to one or more examples, at least one memory may include or store instructions, the at least one memory and the instructions may be configured to, with at least one processor, cause the host device or host system to perform the one or more functions. Additionally, the processor, memory and instructions, serve as means for providing or causing performance by the host device or host system of one or more functions disclosed herein.

The host device or host system may be a general-purpose computer and/or computing system, a special purpose computer and/or computing system, a programmable processing apparatus and/or system, a machine, etc. The host device or host system may be or include or be part of: a user equipment, client device, mobile phone, laptop, computer, network element, data server, network resource controller, network apparatus, router, gateway, network node, computer, cloud-based server, web server, application server, proxy server, etc.

Figure 8:
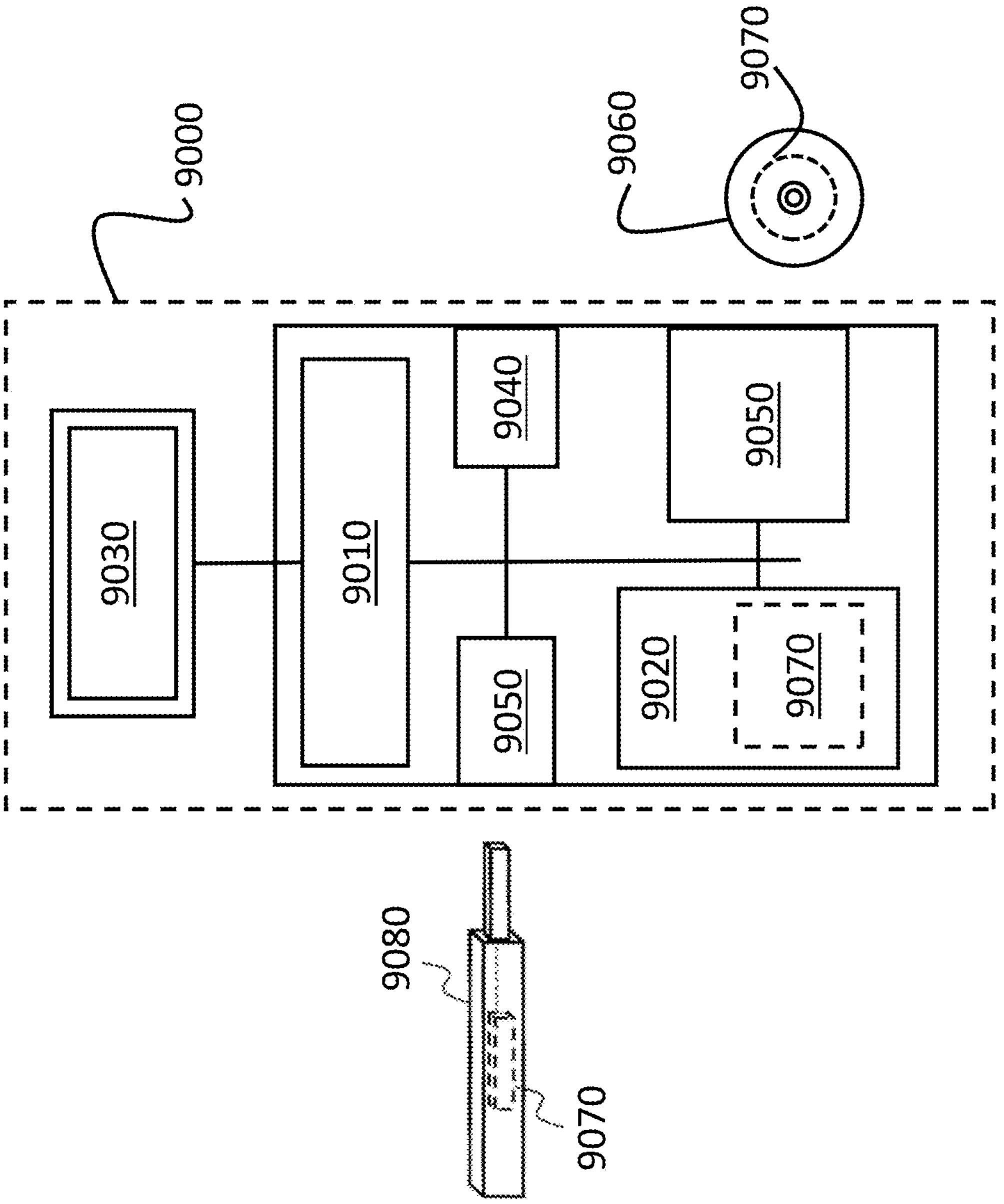
FIG. 8 is a block diagram illustrating an exemplary hardware structure of an apparatus according to an example. The optical network monitor disclosed by reference to FIG. 2 may have such exemplary hardware structure.

FIG. 8 illustrates an example embodiment of an apparatus 9000. The apparatus 9000 may be or may include a monitoring device as disclosed herein. The apparatus 9000 may be used for performing one or more or all steps of a method disclosed herein.

As represented schematically by FIG. 8, the apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random-access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host device or host system to perform one or more functions disclosed herein for the host device or host system.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function (s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

BER bit error rate
CD chromatic dispersion
CFE carrier frequency estimation
CMA constant modulus algorithm
CPE carrier phase estimation
CR chunk recording
DAC digital to analog converter
DGD Differential Group Delay
DSP digital signal processing EVM error vector magnitude
FEC Forward Error Correction
FIR Finite Impulse Response
PMD Polarization Mode Dispersion
QOT Quality of transmission

The invention claimed is:

1. A method comprising:

from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times;

from the optical network, receiving measurements of optical link performance made at the coherent optical receiver in response to recovering data carried by the received optical signal;

identifying at least one of the measurements of optical link performance as being unreliable in response to determining that the estimates indicate the accumulated chromatic dispersion of the optical signal varied at an above threshold rate near a time corresponding to said at least one of the measurements of optical link performance; and evaluating a weighted bit error rate from a subset of the measurements of the optical link performance in response to determining that the measurements of the subset were made near times that the estimates indicate that the accumulated chromatic dispersion of the optical signal varied slower than the threshold rate.

2. The method as in claim 1, wherein at least some of the measurements of optical link performance include at least one of a bit error rate, a number of bit errors, an uncorrected block error, an uncorrected block error rate and an error vector magnitude.

3. The method as in claim 1, wherein at least some of the measurements of optical link performance are indicative of a characteristic type selected from the group consisting of pre-FEC bit-error-rate, rate of change of the pre-FEC bit-error-rate, post-FEC bit-error-rate, rate of change of the post-FEC bit-error-rate, and cycle slip rate.

4. The method of claim 1, wherein the method further includes producing new estimates of the accumulated chromatic dispersion from received samples of the optical signal by operating a digital equalizer with the received samples.

5. The method of claim 1, wherein at least some of the estimates of the accumulated chromatic dispersion are generated with a digital equalizer.

6. An apparatus, comprising:

an optical network monitor connected to receive measurements of optical link performance from an optical network, the measurements being made at a coherent optical receiver of the optical network;

wherein the optical network monitor is also configured to receive estimates of accumulated chromatic dispersion of an optical signal or a rate of change of said accumulated chromatic dispersion, the estimates being indicative of measurements at corresponding times by the coherent optical receiver that received the optical signal from an optical link of the optical network;

wherein the optical network monitor is configured to identify at least one of the measurements of optical link performance as being unreliable in response to determining that the estimates indicate the accumulated chromatic dispersion of the optical signal varied at an above threshold rate near the time of the at least one of the measurements of optical link performance; and wherein the optical network monitor is configured to evaluate a weighted bit error rate from a subset of the measurements of the optical link performance in response to determining that the measurements of the subset were made near times that the estimates indicate that the accumulated chromatic dispersion of the optical signal varied slower than the threshold rate.

7. The apparatus as in claim 6, wherein at least some of the measurements of optical link performance include at least one of a bit error rate, a number of bit errors, an uncorrected block error, an uncorrected block error rate and an error vector magnitude.

8. The apparatus of claim 6, wherein at least some of the measurements of optical link performance are indicative of a characteristic type selected from the group consisting of pre-FEC bit-error-rate, rate of change of the pre-FEC bit-error-rate, post-FEC bit-error-rate, rate of change of the post-FEC bit-error-rate, and cycle slip rate.

9. The apparatus of claim 6, wherein the optical network monitor is configured to produce new estimates of the accumulated chromatic dispersion from received samples of the optical signal by operating a digital equalizer with the received samples.

10. A non-transitory computer-readable medium comprising program instructions stored thereon for causing an apparatus to perform the steps:

from an optical network, receiving estimates of accumulated chromatic dispersion of an optical signal or a rate of change of said accumulated chromatic dispersion, the estimates being indicative of measurements at a coherent optical receiver on the optical signal received from an optical link of the optical network at corresponding times;

from the optical network, receiving measurements of optical link performance made at the coherent optical receiver in response to recovering data carried by the received optical signal; and identifying at least one of the measurements of optical link performance as being unreliable in response to determining that the estimates indicate the accumulated chromatic dispersion of the optical signal varied at an above threshold rate near a time corresponding to said at least one of the measurements of optical link performance; and evaluating a weighted bit error rate from a subset of the measurements of the optical link performance in response to determining that the measurements of the subset were made near times that the estimates indicate that the accumulated chromatic dispersion of the optical signal varied slower than the threshold rate.

11. The non-transitory computer readable medium of claim 10, wherein at least some of the measurements of optical link performance include at least one of a bit error rate, a number of bit errors, an uncorrected block error, an uncorrected block error rate and an error vector magnitude.

12. The non-transitory computer readable medium of claim 10, wherein at least some of the measurements of optical link performance are indicative of a characteristic type selected from the group consisting of pre-FEC bit-error-rate, rate of change of the pre-FEC bit-error-rate, post-FEC bit-error-rate, rate of change of the post-FEC bit-error-rate, and cycle slip rate.

13. The non-transitory computer readable medium of claim 10, further comprising producing new estimates of the accumulated chromatic dispersion from received samples of the optical signal by operating a digital equalizer with the received samples.

14. The non-transitory computer readable medium of claim 10, wherein at least some of the estimates of the accumulated chromatic dispersion are generated with a digital equalizer.

* * * * *